(12) United States Patent
Ueyama et al.

(10) Patent No.: US 6,813,606 B2
(45) Date of Patent: Nov. 2, 2004

(54) CLIENT-SERVER SPEECH PROCESSING SYSTEM, APPARATUS, METHOD, AND STORAGE MEDIUM

(75) Inventors: Teruhiko Ueyama, Kanagawa (JP); Yasuhiro Komori, Kanagawa (JP); Tetsuo Kosaka, Kanagawa (JP); Masayuki Yamada, Kanagawa (JP); Akihiro Kushida, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 336 days.

(21) Appl. No.: 09/739,878

(22) Filed: Dec. 20, 2000

(65) Prior Publication Data

US 2001/0056346 A1 Dec. 27, 2001

(30) Foreign Application Priority Data

May 24, 2000 (JP) ........................................ 2000-153617

(51) Int. Cl.[7] ........................... G10L 21/00; G10L 15/04
(52) U.S. Cl. ..................................... 704/270.1; 704/251
(58) Field of Search ................................. 704/251, 252, 704/270.1

(56) References Cited

U.S. PATENT DOCUMENTS

| | | | |
|---|---|---|---|
| 5,208,863 A | 5/1993 | Sakurai et al. ................ 381/43 |
| 5,220,629 A | 6/1993 | Kosaka et al. ................ 381/52 |
| 5,369,728 A | 11/1994 | Kosaka et al. ............. 395/2.63 |
| 5,621,849 A | 4/1997 | Sakurai et al. ............... 395/2.5 |
| 5,787,396 A | 7/1998 | Komori et al. ............. 704/256 |
| 5,797,116 A | 8/1998 | Yamada et al. ............... 704/10 |
| 5,812,975 A | 9/1998 | Komori et al. ............. 704/256 |
| 5,845,047 A | 12/1998 | Fukada et al. ............ 395/2.77 |
| 5,924,067 A | 7/1999 | Kosaka et al. ............. 704/256 |
| 5,956,679 A | 9/1999 | Komori et al. ............. 704/256 |
| 5,960,399 A * | 9/1999 | Barclay et al. ............. 704/270 |
| 5,970,445 A | 10/1999 | Yamamoto et al. ......... 704/230 |
| 6,076,061 A | 6/2000 | Kawasaki et al. .......... 704/270 |
| 6,108,628 A | 8/2000 | Komori et al. ............. 704/256 |
| 6,195,636 B1 * | 2/2001 | Crupi et al. ................ 704/231 |
| 6,260,013 B1 * | 7/2001 | Sejnoha ...................... 704/240 |
| 6,434,526 B1 * | 8/2002 | Cilurzo et al. ........... 704/270.1 |

* cited by examiner

Primary Examiner—Doris H. To
Assistant Examiner—Michael N. Opsasnick
(74) Attorney, Agent, or Firm—Fitzpatrick, Cella, Harper & Scinto

(57) ABSTRACT

The system implements high-accuracy speech recognition while suppressing the amount of data transfer between the client and server. For this purpose, the client compression-encodes speech parameters by a speech processing unit, and sends the compression-encoded speech parameters to the server. The server receives the compression-encoded speech parameters, and speech processing unit makes speech recognition of the compression-encoded speech parameters, and sends information corresponding to the speech recognition result to the client.

47 Claims, 7 Drawing Sheets

CLIENT-SERVER SPEECH PROCESSING SYSTEM, APPARATUS, METHOD, AND STORAGE MEDIUM

FIELD OF THE INVENTION

The present invention relates to a speech processing system, apparatus, and method that use a terminal (client) and server which can be connected to a network, and a storage medium.

BACKGROUND OF THE INVENTION

Speech recognition is a promising technique as a user interface of a compact apparatus such as a portable terminal or the like. However, it is hard for a portable terminal to implement elaborate speech recognition that requires a large processing volume due to limited resources (the processing performance of a CPU, memory size, and the like) and cost.

As a means for solving such problem, a client-server speech recognition system may be built. In this system, the portable terminal (client) executes light processes, and the server executes heavy processes.

However, upon building such a client-server speech recognition system, balance among the load on the client, the data transfer amount between the client and server, recognition time, and recognition ratio must be taken into consideration.

SUMMARY OF THE INVENTION

The present invention has been made in consideration of the aforementioned problems, and has as its object to provide a speech processing system, apparatus, and method which can implement elaborate speech recognition while suppressing the amount of data transfer between the client and server, and a storage medium.

In order to achieve the above object, a speech processing system according to the present invention is characterized by comprising the following arrangement.

That is, there is provided a speech processing system in which speech information is input at a client side, and speech recognition is done at a server side, the client comprising:

acoustic analysis means for generating speech parameters by acoustically analyzing speech information;

encoding means for compression-encoding the speech parameters; and transmission means for transmitting the compressed-encoded speech parameters, and the server comprising:

reception means for receiving the compression-encoded speech parameters; and speech recognition means for making speech recognition using the speech parameters received by the reception means.

A speech processing apparatus according to the present invention is characterized by comprising, e.g., the following arrangement.

That is, there is provided a speech processing apparatus comprising:

acoustic analysis means for generating speech parameters by acoustically analyzing speech information;

encoding means for compression-encoding the speech parameters; and transmission means for transmitting the speech parameters compressed-encoded by the encoding means.

A speech processing apparatus according to the present invention is characterized by comprising, e.g., the following arrangement.

That is, there is provided a speech processing apparatus comprising:

reception means for receiving compression-encoded speech parameters; and speech recognition means for making speech recognition using the speech parameters received by the reception means.

A speech processing method according to the present invention is characterized by comprising, e.g., the following arrangement.

That is, there is provided a speech processing method in which speech information is input at a client side, and speech recognition is done at a server side, the client comprising:

the acoustic analysis step of generating speech parameters by acoustically analyzing speech information;

the encoding step of compression-encoding the speech parameters; and the transmission step of transmitting the compressed-encoded speech parameters, and the server comprising:

the reception step of receiving the compression-encoded speech parameters; and the speech recognition step of making speech recognition using the speech parameters received in the reception step.

A speech processing method according to the present invention is characterized by comprising, e.g., the following arrangement.

That is, there is provided a speech processing method comprising:

the reception step of receiving compression-encoded speech parameters; and the speech recognition step of making speech recognition using the speech parameters received in the reception step.

A storage medium according to the present invention is characterized by comprising, e.g., the following arrangement. That is, a storage medium stores a control program for making a computer implement the speech processing method.

Other features and advantages of the present invention will be apparent from the following description taken in conjunction with the accompanying drawings, in which like reference characters designate the same or similar parts throughout the figures thereof.

DETAILED DESCRIPTION OF THE PREFERRED EMBODIMENTS

Preferred embodiments of the present invention will be described in detail hereinafter with reference to the accompanying drawings.

First Embodiment

Figure 1:
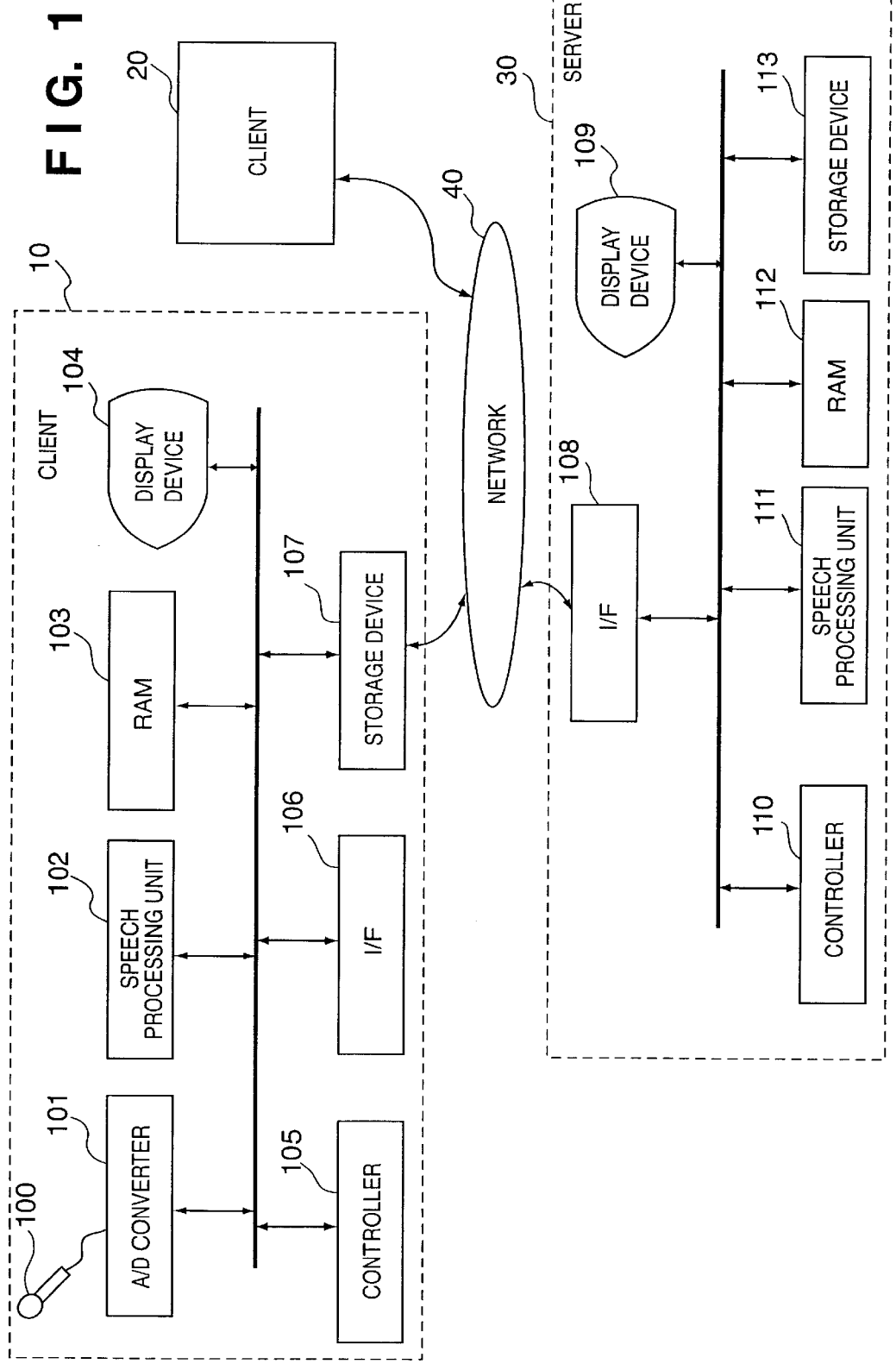
FIG. 1 is a block diagram showing an example of a speech recognition system according to an embodiment of the present invention.

FIG. 1 is a block diagram of a speech recognition system according to an embodiment of the present invention.

Referring to FIG. 1, reference numeral 10 denotes an information terminal serving as a first client; 20, an information terminal serving as a second client; 30, an information processing apparatus serving as a server; and 40, a network for connecting the clients 10 and 20, and the server 30. The clients 10 and 20 are portable information terminals such as a portable phone, portable personal computer, and the like. The network 40 includes a telephone network, mobile communication network, Internet, satellite communication network, and the like.

The arrangement of the client 10 will be explained below. The client 20 has the same arrangement as that of the client 10, and can communicate with the server 30.

Reference numeral 100 denotes a microphone; 101, an A/D converter; 102, a speech processing unit on the client side; 103, a RAM; 104, a display device; 105, a controller; 106, a network interface; and 107, a storage device.

The microphone 100 inputs speech information (language such as Japanese, English, or the like) spoken by the user. The A/D converter 101 samples speech information supplied from the microphone 100 at a predetermined sampling frequency to convert it into digital speech information.

The speech processing unit 102 acoustically analyzes speech information supplied from the A/D converter 101 to obtain speech parameters (to be also referred to as feature parameters) in a predetermined format. The unit 102 then compression-codes the speech parameters. The compression-coded speech parameters are supplied to the network interface.

The display device 104 comprises a display such as a liquid crystal display panel or the like, which displays the recognition result of the server 30 received by the network interface 106.

The controller 105 comprises a central process unit (CPU). The controller 105 reads out various control programs stored in the storage device 107, and controls the functions of the client 10 (to be described later) using the RAM 103 as a work area.

The interface 106 controls communications with the server 30 connected to the network 40. The interface 106 guarantees detection of omission and arrival order of transmission data using a communication protocol such as TCP/IP or the like.

The storage device 107 comprises a semiconductor memory, magnetic recording medium, optical recording medium, hard disk, or the like. The storage device 107 stores a control program for displaying the speech recognition result of the server 30, an application program that implements predetermined operations on the basis of the speech recognition result of the server 30, a boot program, an operation system (OS), and the like.

The speech processing unit 102 of this embodiment can be implemented by either hardware or software. In case of software implementation, a control program for software implementation is stored in the storage device 107. In this case, when the power switch of the client 10 is turned on, the controller 105 launches the boot program and OS stored in the storage device 107, and then launches the control program storage device 107, thus executing the processing sequence of the speech processing unit 102 (to be described later).

The arrangement of the server 30 will be described below.

Reference numeral 108 denotes a network interface; 109, a display device; 110, a controller; 111, a speech processing unit; 112, a RAM; and 113, a storage device.

The interface 108 controls communications with the clients 10 and 20 connected to the network 40. The interface 108 guarantees detection of omission and arrival order of transmission data using a communication protocol such as TCP/IP or the like. The display device 109 comprises a display such as a liquid crystal display panel or the like.

The controller 110 comprises a central processing unit (CPU). The controller 110 reads out various control programs stored in the storage device 113, and controls the functions of the server 30 (to be described later) using the RAM 112 as a work area.

The speech processing unit 111 makes speech recognition using the compressed speech parameters received by the interface 108. Information corresponding to the speech recognition result is supplied to the network interface 108.

The storage device 113 comprises a semiconductor memory, magnetic recording medium, optical recording medium, hard disk, or the like. The storage device 113 stores an application program that implements predetermined operations on the basis of the speech recognition result of the speech processing unit 111, a boot program, an operation system (OS), and the like.

The speech processing unit 111 of this embodiment can be implemented by either hardware or software. In case of software implementation, a control program for software implementation is stored in the storage device 113. In this case, when the power switch of the server 30 is turned on, the controller 110 launches the boot program and OS stored in the storage device 113, and then launches the control program storage device 113, thus executing the processing sequence of the speech processing unit 111 (to be described later).

Figure 2:
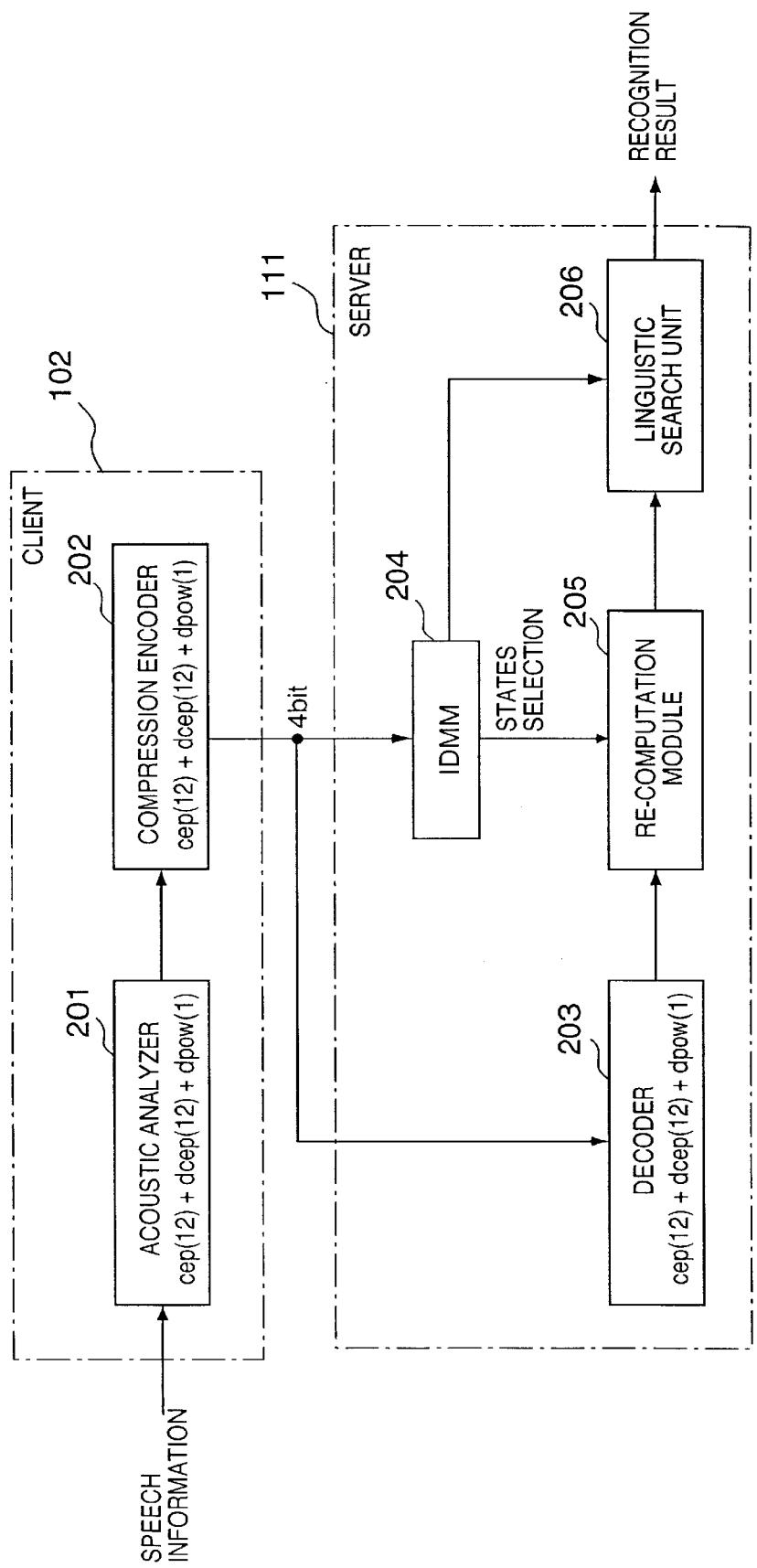
FIG. 2 is a block diagram showing the arrangement of a speech processing unit on the client side and the arrangement of a speech processing unit on the server side in the first embodiment.

FIG. 2 is a diagram for explaining the arrangements of the speech processing units 102 and 111 in detail in the first embodiment.

The arrangement of the speech processing unit 102 of the clients 10 and 20 will be explained first.

Reference numeral 201 denotes an acoustic analyzer. The acoustic analyzer 201 detects vocal activity or talkspurts periods of input speech, makes acoustic analysis in units of vocal activity periods, and generates speech parameters in the predetermined format. FIG. 2 exemplifies a case wherein 25-dimensional speech parameters consisting of 12-dimensional parameters (e.g., 12-dimensional LPC mel-cepstrum) indicating static features, and 13-dimensional parameters (e.g., 12-dimensional $\Delta$LPC mel-cepstrum and 1-dimensional $\Delta$ power) indicating dynamic features such as a change along with an elapse of time are generated.

Reference numeral 202 denotes a compression encoder. The compression encoder 202 scalar-quantizes 25-dimensional speech parameters generated by the acoustic analyzer 201 in units of dimensions, and converts them into 4-bit compressed speech parameters per dimension. The compressed speech parameters are supplied to the interface 106, which sends them to the interface 108 of the server 108.

For example, when acoustic analysis is done at a frame period of 10 ms and respective dimensions of the 25-dimensional speech parameters are scalar-quantized to be converted into 4-bit compressed speech parameters, the data transmission rate of the compressed speech parameters is:

25 dimensions×100 frames/sec×4 bits=10 kbps

By contrast, in a speech recognition system that sends 25-dimensional speech parameters to the server 30 without scalar quantization, the data transmission rate of the compressed speech parameters is:

25 dimensions×100 frames/sec×4 bytes×8 bits=80 kbps

As described above, since the client 10 or 20 executes acoustic analysis and compression coding, it need not execute a speech recognition process with the heaviest load. In this way, the load on the client is greatly reduced, and a cost reduction can be achieved. Since the speech parameters are sent to the server after they have undergone compression coding, the data transmission amount between the client and server can be greatly reduced.

The arrangement of the speech processing unit 111 of the server 30 will be explained below.

Reference numeral 203 denotes a decoder. The decoder 203 decodes compressed speech parameters sent at the data transmission rate of 10 kbps to convert them into 25-dimensional speech parameters (12-dimensional LPC mel-cepstrum, 12-dimensional ΔLPC mel-cepstrum, and 1-dimensional Δ power).

Reference numeral 204 denotes an IDMM (Independent Dimension Multi-Mixture computation) computation module. The IDMM computation module 204 computes output probabilities of acoustic models using the received compressed speech parameters by approximation at high speed in accordance with IDMM. In this embodiment, mixed continuous distribution HMMs having phonemes as phonetic units are used as acoustic models.

IDMM is a computation method for computing the output probability of mixed distribution acoustic models by approximation. In this embodiment, each mixed distribution uses a diagonal covariance matrix Gaussian distribution.

An output probability $b_s(x)$ of an acoustic model s with respect to an N-dimensional speech parameter vector x is given by:

$$b_s(x) = \sum_{m=1}^{M_s} w_{s,m} \prod_{i=1}^{N} N_{s,m,i}(x_i) \quad (1)$$

On the other hand, assuming that each dimension can be independently computed, an output probability $\hat{b}_s(x)$ of the acoustic model s is defined by:

$$\hat{b}(x) \stackrel{def}{=} \prod_{i=1}^{N} \sum_{m=1}^{M_s} w_{s,m} N_{s,m,i}(x) \quad (2)$$

where $M_s$ is the number of mixture components for acoustic model s, $M_{s,m,i}$ is the Gaussian distribution function of the i-th dimension in the m-th distribution of the acoustic model s, and $w_{s,m}$ is the weight in the m-th distribution of the acoustic model s.

Upon computing a logarithmic output probability, equation (2) is rewritten as:

$$\log \hat{b}_s(x) \stackrel{def}{=} \sum_{i=1}^{N} \log \left( \sum_{m=1}^{M_s} w_{s,m} N_{s,m,i}(x) \right) \quad (3)$$

In this embodiment, a table that stores correspondence between encoded codes (quantized values obtained by scalar quantization in this embodiment) of input speech parameters $x_I$ of i-th dimensions, and the output probabilities of logarithmic mixed Gaussian distributions of i-th dimensions is prepared in advance, and the logarithmic output probability of the acoustic model s is computed at high speed by N table lookups and N−1 additions.

Reference numeral 205 denotes a re-computation module. The re-computation module 205 checks if the output probability obtained by the IDMM computation module 204 is larger than a predetermined value. If the output probability is larger than the predetermined value, the re-computation module 205 re-computes the output probability with high accuracy using the speech parameters obtained by the decoder 203.

Reference numeral 206 denotes a linguistic search module which comprises word dictionaries and grammatical rules corresponding to a plurality of different languages. The linguistic search module 206 makes linguistic search on the basis of the computation result of the re-computation module 205 and the computation result of the IDMM computation module 204, and obtains a recognition result corresponding to the received compressed speech parameters.

As described above, the server 30 computes the output probabilities of acoustic models directly using the received compressed speech parameters, and accurately re-calculates output probabilities, which are larger than the predetermined value, using the decoded compressed speech parameters, thus obtaining output probabilities at high speed and with high accuracy while suppressing recognition ratio drop.

Figure 3:
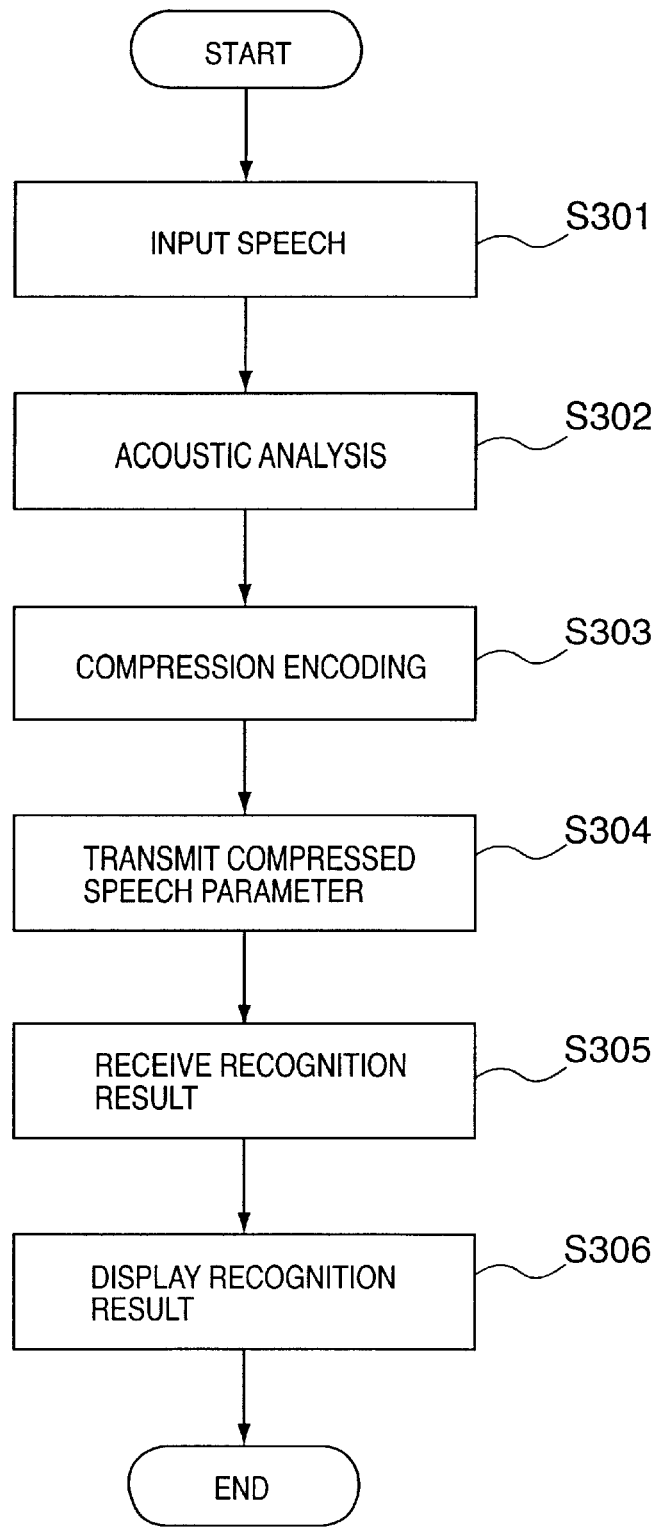
FIG. 3 is a flow chart for explaining the processing sequence on the client side in the first embodiment.

FIG. 3 is a flow chart showing the processing sequence of the clients 10 and 20 in the first embodiment. The control program that controls this processing sequence is stored in the storage device 107, and is executed by the controller 105.

In step S301, the A/D converter 101 receives speech information spoken by the user via the microphone 100, samples the speech information at a predetermined sampling frequency, and converts it into digital speech information. The digital speech information is supplied to the speech processing unit 102.

In step S302, the acoustic analyzer 201 acoustically analyzes in units of predetermined vocal activity periods, and generates 25-dimensional speech parameters including parameters indicating static and dynamic features (i.e., 12-dimensional LPC mel-cepstrum, 12-dimensional ΔLPC mel-cepstrum, and 1-dimensional Δ power).

In step S303, the compression encoder 202 converts the 25-dimensional speech parameters generated by the acoustic analyzer 201 into 4-bit compressed speech parameters per dimension by scalar quantization in units of dimensions. The compressed speech parameters are supplied to the interface 106, and are then transferred to the interface 108 of the server 30.

In step S304, the interface 106 transmits the compressed speech parameters that have undergone compression coding by the compression encoder 202 to the server 30 connected via the network 40. The server 30 executes speech recognition of the compressed speech parameters in accordance with the processing sequence shown in FIG. 4.

In step S305, the interface 106 receives character information or a control code as a speech recognition result of the server 30, or information corresponding to a control code as a speech recognition result of the server 30.

If character information is received in step S305, the display device 104 displays the received character information (step S306). If a control code is received, the controller 105 runs a predetermined application program of the client 10 using the control code, and displays the obtained result on the display device 104 (step S306).

Figure 4:
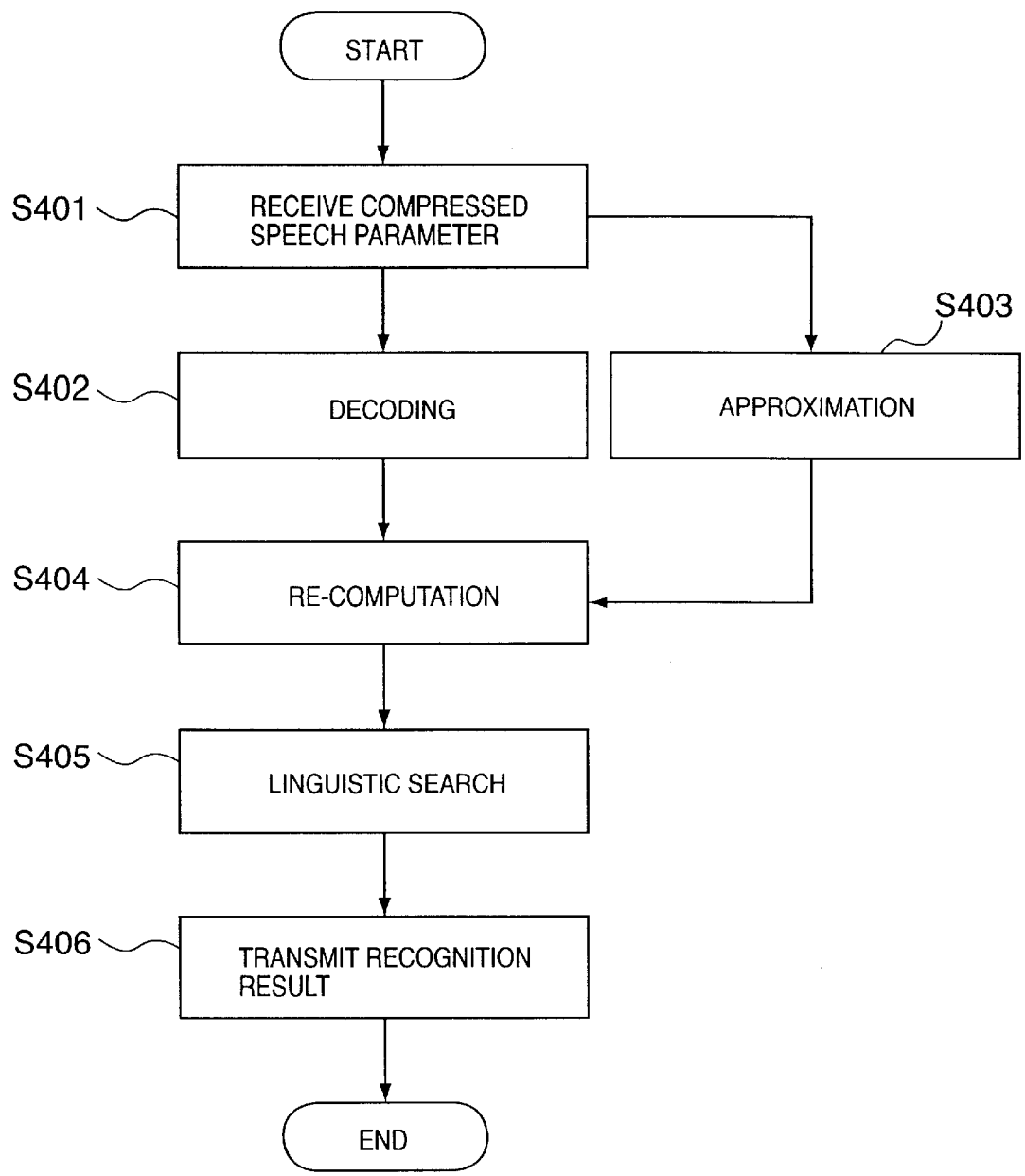
FIG. 4 is a flow chart for explaining the processing sequence on the server side in the first embodiment.

FIG. 4 is a flow chart for explaining the processing sequence of the server 30 in the first embodiment. The control program, which controls this processing sequence, is stored in the storage device 113, and is executed by the controller 110.

In step S401, the interface 108 receives the compressed speech parameters sent from the client 10 or 20. The compressed speech parameters are supplied to the speech processing unit 111.

In step S402, the decoder 203 decodes the compressed speech parameters to convert them into 25-dimensional speech parameters (12-dimensional LPC mel-cepstrum, 12-dimensional $\Delta$LPC mel-cepstrum, and 1-dimensional $\Delta$ power).

On the other hand, in step S403 the IDMM computation module 204 computes the output probabilities of acoustic models using the compressed speech parameters received in step S401 at high speed by approximation parallel to decoding of the compressed speech parameters.

The re-computation module 205 checks in step S404 if the output probability computed in step S403 is larger than a predetermined value. If the output probability is larger than the predetermined value, the re-computation module 205 re-computes the output probability with high accuracy using the compressed speech parameters decoded in step S402.

In step S405, the linguistic search module 206 makes linguistic search on the basis of the output probabilities computed by the IDMM computation module 204 and the output probabilities re-computed by the re-computation module 205 to recognize character information or a control code corresponding to the compressed speech parameters. The recognized character information or control code is supplied to the interface 108 or controller 110. When the control code is supplied to the controller 110, the controller 110 runs a predetermined application program using that control code, and supplies the obtained result to the interface 108, which sends that result to the client.

The predetermined application program includes a contents distribution system for offering contents corresponding to the recognized control code from the server 30 to the client 10, an information service system for offering information corresponding to the control code from the server 30 to the client 10, a ticket reservation system for reserving a ticket corresponding to the control code, and the like.

As described above, according to the first embodiment, a client-server speech recognition system that can achieve a cost reduction on the client side and can implement, high-speed, high-accuracy speech recognition while suppressing the load on the client and the data transfer amount between the client and server can be provided.

In the first embodiment, the arrangement of linguistic search is made based on the output probabilities computed at the IDMM computation module 204 and the re-computation module 205, however, the linguistic search can be also made only based on the output probability obtained by the IDMM computation module 204. In the latter case, the recognition ratio drops, but the recognition result can be obtained at high speed. Further, as the decoder 203 and the re-computation module 205 become unnecessary, the structure of the speech processing unit 111 can be simplified, and the cost for the speech processing unit 111 can be reduced.

Second Embodiment

Figure 5:
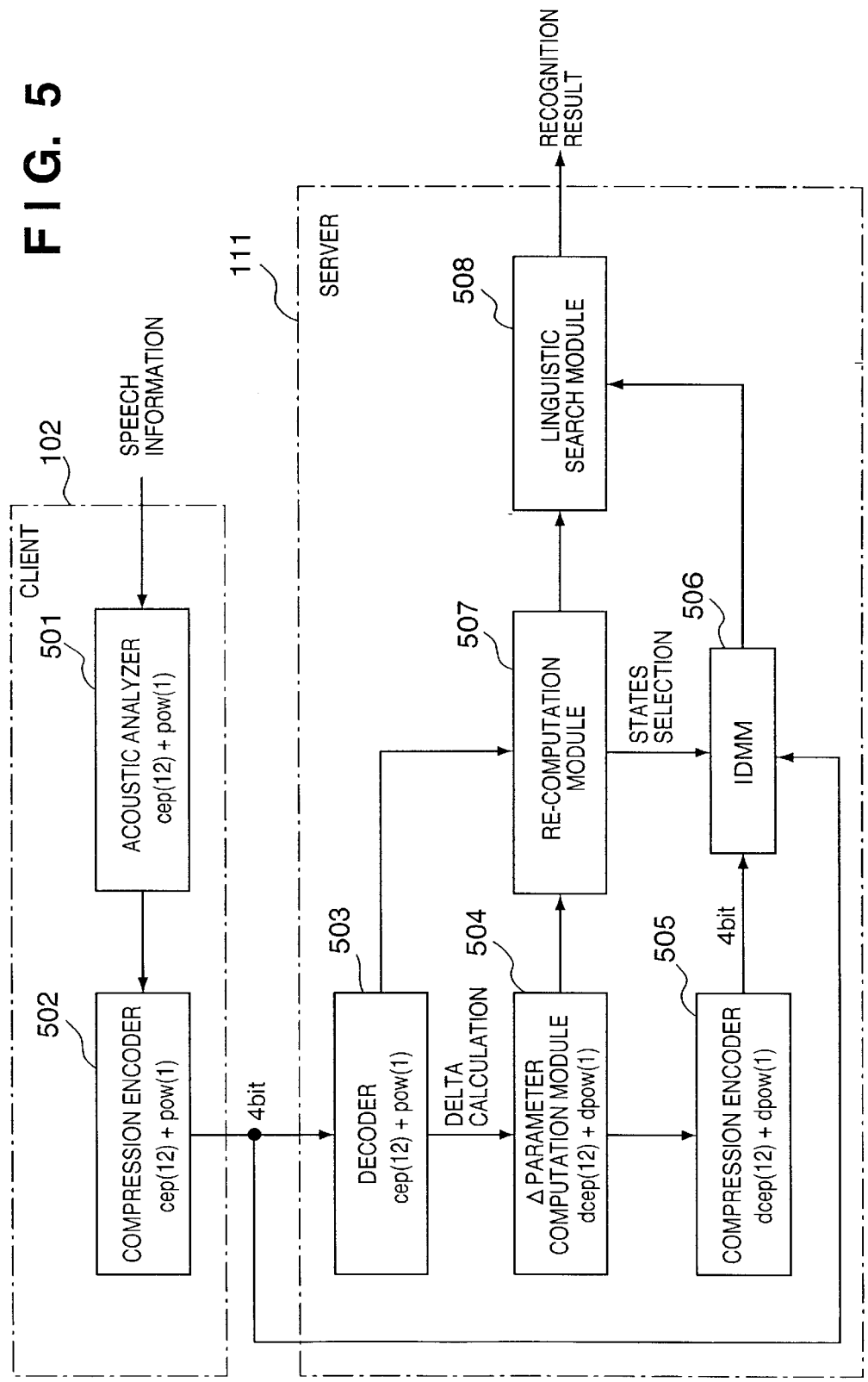
FIG. 5 is a block diagram showing the arrangement of a speech processing unit on the client side and the arrangement of a speech processing unit on the server side in the second embodiment.

FIG. 5 is a block diagram for explaining the arrangements of the speech processing units 102 and 111 in the second embodiment in detail.

A $\Delta$ parameter as a dynamic speech parameter may be computed on the server 30 side. In the second embodiment, the $\Delta$ parameter is computed on the server 30 side to assure a higher data transfer rate than the first embodiment.

The arrangement of the speech processing unit 102 of the clients 10 and 20 will be explained below.

Reference numeral 501 denotes an acoustic analyzer. The acoustic analyzer 501 detects vocal activity periods of input speech, makes acoustic analysis in units of vocal activity periods, and generates speech parameters in the predetermined format. FIG. 5 exemplifies a case wherein 13-dimensional speech parameters consisting of 13-dimensional parameters indicating static features (e.g., 12-dimensional LPC mel-cepstrum and 1-dimensional $\Delta$ power) are generated.

Reference numeral 502 denotes a compression encoder. The compression encoder 502 scalar-quantizes 13-dimensional speech parameters generated by the acoustic analyzer 501 in units of dimensions, and converts them into 4-bit compressed speech parameters per dimension. The compressed speech parameters are supplied to the interface 106, which sends them to the interface 108 of the server 108.

For example, when acoustic analysis is done at a frame period of 10 ms and respective dimensions of the 25-dimensional speech parameters are scalar-quantized to be converted into 4-bit compressed speech parameters, the data transmission rate of the compressed speech parameters is:

$$13 \text{ dimensions} \times 100 \text{ frames/sec} \times 4 \text{ bits} = 5.2 \text{ kbps}$$

As described above, since the clients 10 and 20 in the second embodiment transfer scalar-quantized 13-dimensional speech parameters to the server 30, the load on the client can be further suppressed, a further cost reduction can be achieved, and the data transfer amount can be further reduced compared to the first embodiment.

The arrangement of the speech processing unit 111 of the server 30 will be explained below.

Reference numeral 503 denotes a decoder. The decoder 503 decodes compressed speech parameters sent at the data transmission rate of 5.2 kbps to convert them into 13-dimensional speech parameters (12-dimensional LPC mel-cepstrum and 1-dimensional $\Delta$ power).

Reference numeral 504 denotes a $\Delta$ parameter computation module. The $\Delta$ parameter computation module 504 computes 13-dimensional $\Delta$ parameters indicating dynamic features (12-dimensional $\Delta$LPC mel-cepstrum and 1-dimensional $\Delta$ power) using the 13-dimensional speech parameters decoded by the decoder 503.

Reference numeral 505 denotes a compression encoder. The compression encoder 505 compression-encodes the 13-dimensional $\Delta$ parameters computed by the $\Delta$ parameter computation module 504 in units of dimensions using the same coding method as in the compression encoder 502. In this embodiment, the encoder 505 scalar-quantizes the 13-dimensional $\Delta$ parameters in units of dimensions to convert them into 4-bit compressed speech parameters per dimension.

Reference numeral 506 denotes an IDMM computation module. The IDMM computation module 506 computes the output probabilities of acoustic models using the received compressed speech parameters and the compressed speech parameters obtained by the compression encoder 505 by approximation at high speed in accordance with IDMM mentioned above.

Reference numeral 507 denotes a re-computation module. The re-computation module 507 checks if the output probability obtained by the IDMM computation module 506 is larger than a predetermined value. If the output probability is larger than the predetermined value, the re-computation module 507 re-computes the output probability with high accuracy using the speech parameters obtained by the decoder 503 and Δ parameter computation module 504.

Reference numeral 508 denotes a linguistic search module which comprises word dictionaries and grammatical rules corresponding to a plurality of different languages. The linguistic search module 508 makes linguistic search on the basis of the computation result of the re-computation module 507 and the computation result of the IDMM computation module 506, and obtains a recognition result corresponding to the received compressed speech parameters.

As described above, since the server 30 in the second embodiment comprises the arrangement for computing parameters indicating dynamic features from parameters indicating static features, the data transfer amount between the server and client can be further reduced compared to the first embodiment. Also, the output probabilities can be computed at high speed and with high accuracy while suppressing recognition rate drop, as in the first embodiment.

Figure 6:
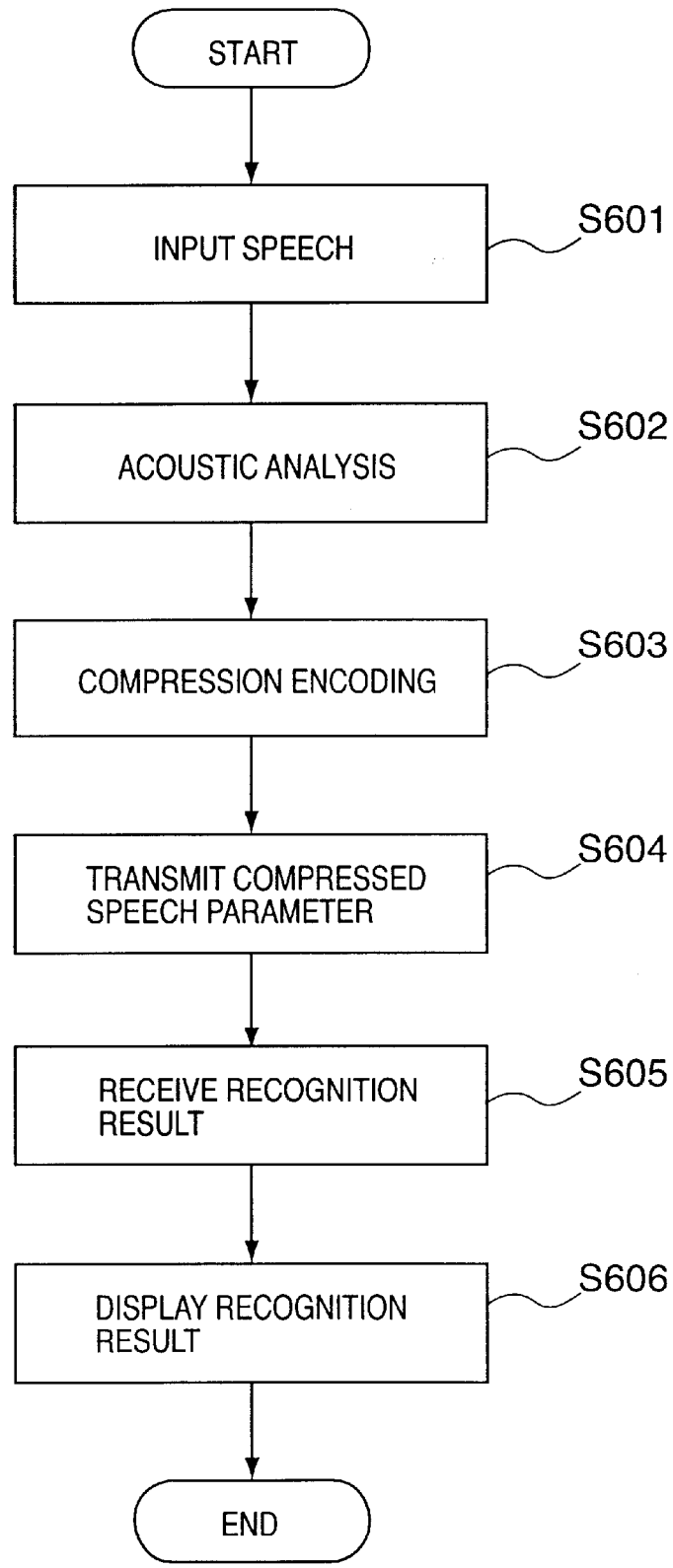
FIG. 6 is a flow chart for explaining the processing sequence on the client side in the second embodiment.

FIG. 6 is a flow chart for explaining the processing sequence of the clients 10 and 20 in the second embodiment. The control program that controls this processing sequence is stored in the storage device 107, and is executed by the controller 105.

In step S601, the A/D converter 101 receives speech information spoken by the user via the microphone 100, samples the speech information at a predetermined sampling frequency, and converts it into digital speech information. The digital speech information is supplied to the speech processing unit 102.

In step S602, the acoustic analyzer 501 acoustically analyzes in units of predetermined vocal activity periods, and generates 13-dimensional speech parameters including parameters indicating static features (i.e., 12-dimensional LPC mel-cepstrum and 1-dimensional power).

In step S603, the compression encoder 502 converts the 13-dimensional speech parameters generated by the acoustic analyzer 501 into 4-bit compressed speech parameters per dimension by scalar quantization in units of dimensions. The compressed speech parameters are supplied to the interface 106, and are then transferred to the interface 108 of the server 30.

In step S604, the interface 106 transmits the compressed speech parameters that have undergone compression coding by the compression encoder 502 to the server 30 connected via the network 40. The server 30 executes speech recognition of the compressed speech parameters in accordance with the processing sequence shown in FIG. 7.

In step S605, the interface 106 receives character information or a control code as a speech recognition result of the server 30, or information corresponding to a control code as a speech recognition result of the server 30.

If character information is received in step S605, the display device 104 displays the received character information (step S606). If a control code is received, the controller 105 runs a predetermined application program of the client 10 using the control code, and displays the obtained result on the display device 104 (step S606).

Figure 7:
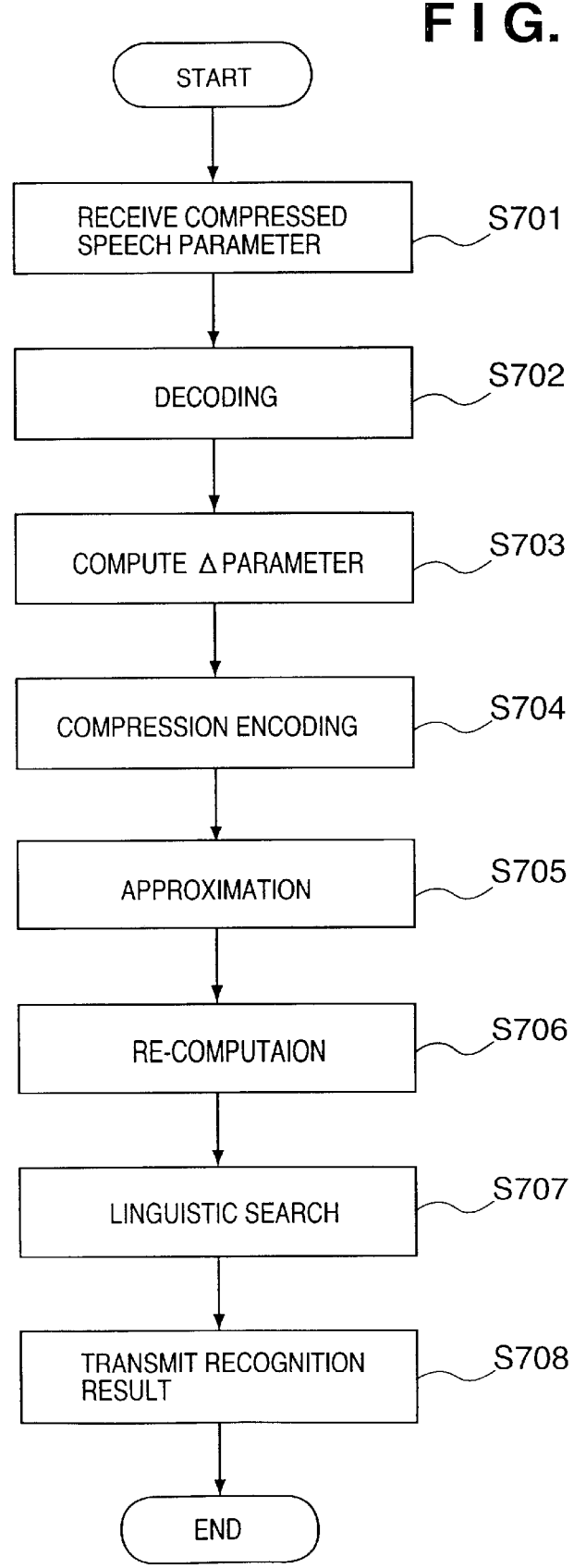
FIG. 7 is a flow chart for explaining the processing sequence on the server side in the second embodiment.

FIG. 7 is a flow chart for explaining the processing sequence of the server 30 in the second embodiment. The control program, which controls this processing sequence, is stored in the storage device 113, and is executed by the controller 110.

In step S701, the interface 108 receives the compressed speech parameters sent from the client 10 or 20. The compressed speech parameters are supplied to the speech processing unit 111.

In step S702, the decoder 503 decodes the compressed speech parameters to convert them into 13-dimensional speech parameters (12-dimensional LPC mel-cepstrum and 1-dimensional power).

In step S703, the Δ parameter computation module 504 computes 13-dimensional Δ parameters indicating dynamic features (12-dimensional ΔLPC mel-cepstrum and 1-dimensional Δ power) using the 13-dimensional speech parameters decoded by the decoder 503.

In step S704, the compression encoder 505 converts the 13-dimensional Δ parameters computed by the Δ parameter computation module 504 into 4-bit compressed speech parameters per dimension by scalar quantization in units of dimensions.

In step S705, the IDMM computation module 506 computes the output probabilities of acoustic models using the compressed speech parameters obtained in step S701 and the compressed speech parameters obtained in step S704 at high speed by approximation.

The re-computation module 507 checks in step S706 if the output probability computed in step S705 is larger than a predetermined value. If the output probability is larger than the predetermined value, the re-computation module 507 re-computes the output probability with high accuracy using the compressed speech parameters decoded in step S702 and the speech parameters computed in step S703.

In step S707, the linguistic search module 508 makes linguistic search on the basis of the output probabilities computed by the IDMM computation module 506 and the output probabilities re-computed by the re-computation module 507 to recognize character information or a control code corresponding to the compressed speech parameters. The recognized character information or control code is supplied to the interface 108 or controller 110. When the control code is supplied to the controller 110, the controller 110 runs a predetermined application program using that control code, and supplies the obtained result to the interface 108, which sends that result to the client.

The predetermined application program includes a contents distribution system for offering contents corresponding to the recognized control code from the server 30 to the client 10, an information service system for offering information corresponding to the control code from the server 30 to the client 10, a ticket reservation system for reserving a ticket corresponding to the control code, and the like.

As described above, according to the second embodiment, a client-server speech recognition system that can further suppress the load on the client and data transfer amount between the client and server compared to the first embodiment can be provided.

In the second embodiment, the arrangement of linguistic search is made based on the output probabilities computed at the IDMM computation module 506 and the re-computation module 507, however, the linguistic search can be also made only based on the output probability obtained by the IDMM computation module 506. In the latter case, the recognition ratio drops, but the recognition result can be obtained at high speed. Further, as the re-computation module 507 becomes unnecessary, the structure of the speech processing unit 111 can be simplified, and the cost for the speech processing unit 111 can be reduced.

In the above embodiments, speech parameters are scalar-quantized. However, the present invention is not limited to such specific arrangement. Alternatively, speech parameters may be vector-quantized.

In the above embodiments, the speech recognition result of the server 30 is sent back to the client 10 or 20. However, the present invention is not limited to such specific arrangement. Alternatively, the speech recognition result may be sent to an arbitrary terminal or a plurality of terminals including the clients 10 and 20 connected to the network 40.

The client and server in the above embodiments are also achieved by installing a storage medium (or recording medium), which records a program code of software that can implement the functions of the above-mentioned embodiments to a versatile information processing apparatus such as a personal computer, workstation, or the like, and making a computer (or a CPU or MPU) execute the program code. In this case, the program code itself read out from the storage medium implements the functions of the above-mentioned embodiments, and the storage medium which stores the program code constitutes the present invention. The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the storage medium is written in a memory of the extension card or unit.

As described above, according to the present invention, high-accuracy speech recognition can be implemented while suppressing the data transfer amount between the client and server.

As many apparently widely different embodiments of the present invention can be made without departing from the spirit and scope thereof, it is to be understood that the invention is not limited to the specific embodiments thereof except as defined in the appended claims.

What is claimed is:

1. A speech processing system in which speech information is input at a client side, and speech recognition is done at a serve side, said client comprising:

acoustic analysis means for generating speech parameters by acoustically analyzing speech information;

encoding means for compression-encoding the speech parameters; and transmission means for transmitting the compression-encoded speech parameters, and said server comprising:

reception means for receiving the compression-encoded speech parameters;

first computation means for computing output probabilities of states of acoustic models, as first likelihood, using the compression-encoded speech parameters received by said reception means;

selection means for selecting states of acoustic models using only the first likelihood;

decoding means for decoding the compression-encoded speech parameters received by said reception means;

second computation means for computing output probabilities of states of acoustic models selected by said selection means, as second likelihood, using the decoded speech parameters; and speech recognition means for making speech recognition using the second likelihood obtained by said second computation means.

2. The system according to claim 1, wherein said encoding means scalar-quantizes the speech parameters.

3. The system according to claim 1, wherein the speech parameters include parameters indicating static and dynamic features.

4. The system according to claim 1, wherein said server further comprises transmission means for transmitting a recognition result of said speech recognition means to said client.

5. The system according to claim 1, wherein said client further comprises reception means for receiving a speech recognition result of said server using the speech parameters.

6. The system according to claim 1, wherein said selection means selects acoustic models having output probabilities larger than a predetermined value.

7. The system according to claim 1, wherein said selection means selects acoustic models having output probabilities within a predetermined range of which the largest value is a largest output probability computed by said first computation means.

8. The system according to claim 1, wherein the speech parameters include parameters indicating static features.

9. The system according to claim 8, wherein said server further comprises feature parameter generation means for generating parameters indicating dynamic features using the speech parameters decoded by said decoding means.

10. The system according to claim 9, wherein said server further comprises feature parameter encoding means for compression-encoding the parameters generated by said feature parameter generation means using an encoding method that compression-encodes the speech parameters received by said reception means.

11. A speech processing apparatus comprising:

reception means for receiving compression-encoded speech parameters from a client via a network;

first computation means for computing output probabilities of states of acoustic models, as first likelihood, using the compression-encoded speech parameters received by said reception means;

selection means for selecting states of acoustic models using only the first likelihood;

decoding means for decoding the compression-encoded speech parameters received by said reception means;

second computation means for computing output probabilities of states of acoustic models selected by said selection means, as second likelihood, using the decoded speech parameters; and speech recognition means for making speech recognition using the second likelihood obtained by said second computation means.

12. The apparatus according to claim 11, wherein said reception means receives scalar-quantized speech parameters.

13. The apparatus according to claim 11, wherein the speech parameters include parameters indicating static and dynamic features.

14. The apparatus according to claim 11, wherein said selection means selects acoustic models having output probabilities larger than a predetermined value.

15. The apparatus according to claim 11, wherein said selection means selects acoustic models having output probabilities within a predetermined range of which the largest value is a largest output probability computed by said first computation means.

16. The apparatus according to claim 11, wherein said reception means receives the compression-encoded speech parameters from a client connected to a network.

17. The apparatus according to claim 16, further comprising transmission means for transmitting a recognition result of said speech recognition means to the client.

18. The apparatus according to claim 11, wherein the speech parameters include parameters indicating static features.

19. The apparatus according to claim 18, further comprising feature parameter generation means for generating parameters indicating dynamic features using the speech parameters decoded by said decoding means.

20. The apparatus according to claim 19, further comprising feature parameter encoding means for compression-encoding the parameters generate by said dynamic speech parameter generation means using an encoding method that compression-encodes the speech parameters received by said reception means.

21. A speech processing method in which speech information is input at a client side, and speech recognition is done at a server side,
comprising at the client side:
an acoustic analysis step of generating speech parameters by acoustically analyzing speech information;
an encoding step of compression-encoding the speech parameters; and
a transmission step of transmitting the compression-encoded speech parameters, and
comprising at the server side:
a reception step of receiving the compression-encoded speech parameters;
a first computation step of computing output probabilities of states of acoustic models, as first likelihood, using the compression-encoded speech parameters received in said reception step;
a selection step of selecting states of acoustic models using only the first likelihood;
a decoding step of decoding the compression-encoded speech parameters received in said reception step;
a second computation step of computing output probabilities of states of acoustic models selected in said selection step, as second likelihood, using the decoded speech parameters; and
a speech recognition step of making speech recognition using the second likelihood obtained in said second computation step.

22. A storage medium that stores a control program for making a computer implement the method recited in claim 21.

23. The method according to claim 21, wherein in said selection step, acoustic models having output probabilities larger than a predetermined value are selected.

24. The method according to claim 21, wherein in said selection step, acoustic models having output probabilities within a predetermined range of which the largest value is a largest output probability computed in said first computation step are selected.

25. A speech processing method comprising:
a reception step of receiving compression-encoded speech parameters from a client via a network;
a first computation step for computing output probabilities of states of acoustic models, as first likelihood, using the compression-encoded speech parameters received in said reception step;
a selection step of selecting states of acoustic models using only the first likelihood;
a decoding step of decoding the compression-encoded speech parameters received in said reception step;
a second computation step of computing output probabilities of states of acoustic models selected in said selection step, as second likelihood, using the decoded speech parameters; and
a speech recognition step of making speech recognition using the second likelihood obtained in said second computation step.

26. The method according to claim 25, wherein said reception step includes a step of receiving the compression-encoded speech parameters from a client connected to a network.

27. The method according to claim 25, further comprising a transmission step of transmitting a recognition result in said speech recognition step to the client.

28. A storage medium that stores a control program for making a computer implement the method recited in claim 25.

29. The method according to claim 25, wherein in said selection step, acoustic models having output probabilities larger than a predetermined value are selected.

30. The method according to claim 25, wherein in said selection step, acoustic models having output probabilities within a predetermined range of which the largest value is a largest output probability computed in said first computation step are selected.

31. The method according to claim 25, wherein the reception step includes the step of receiving scalar-quantized speech parameters.

32. The method according to claim 25, wherein the speech parameters include parameters indicating static and dynamic features.

33. The method according to claim 25, wherein the speech parameters include parameters indicating static features.

34. The method according to claim 33, further comprising a feature parameter generation step of generating parameters indicating dynamic features using the speech parameters decoded in said decoding step.

35. The method according to claim 34, further comprising a feature parameter encoding step of compression-encoding the parameters, which are generated in said dynamic speech parameter generation step and indicate dynamic features, using an encoding method that compression-encodes the speech parameters received in said reception step.

36. A speech processing program in which speech information is input at a client side, and speech recognition is done at a server side, said program implementing,
at the client side:
an acoustic analysis step of generating speech parameters by acoustically analyzing speech information;
an encoding step of compression-encoding the speech parameters; and
a transmission step of transmitting the compression-encoded speech parameters, and
at the server side:
a reception step of receiving compression-encoded speech parameters;
a first computation step of computing output probabilities of states of acoustic models, as first likelihood, using the compression-encoded speech parameters received in said reception step;

a selection step of selecting states of acoustic models using only the first likelihood;

a decoding step of decoding the compression-encoded speech parameters received in said reception step;

a second computation step of computing output probabilities of states of acoustic models selected in said selection step, as second likelihood, using the decoded speech parameters; and a speech recognition step of making speech recognition using the second likelihood obtained in said second computation step.

37. The program according to claim 36, wherein in said selection step, acoustic models having output probabilities larger than a predetermined value are selected.

38. The program according to claim 36, wherein in said selection step, acoustic models having output probabilities within a predetermined range of which the largest value is a largest output probability computed in said first computation step are selected.

39. A speech processing program implementing:

a reception step of receiving compression-encoded speech parameters from a client via a network;

a first computation step of computing output probabilities of states of acoustic models, as first likelihood, using the compression-encoded speech parameters received in said reception step;

a selection step of selecting states of acoustic models using only the first likelihood;

a decoding step of decoding the compression-encoded speech parameters received in said reception step;

a second computation step of computing output probabilities of states of acoustic models selected in said selection step, as second likelihood, using the decoded speech parameters; and a speech recognition step of making speech recognition using the second likelihood obtained in said second computation step.

40. The program according to claim 39, wherein in said selection step, acoustic models having output probabilities larger than a predetermined value are selected.

41. The program according to claim 39, wherein in said selection step, acoustic models having output probabilities within a predetermined range of which the largest value is a largest output probability computed in said first computation step are selected.

42. A speech processing system in which speech information is input at a client side, and speech recognition is done at a server side, said client comprising:

an acoustic analysis unit adapted to generate speech parameters by acoustically analyzing speech information;

an encoding unit adapted to compression-encode the speech parameters; and a transmission unit adapted to transmit the compression-encoded speech parameters, and said server comprising:

a reception unit adapted to receive the compression-encode speech parameters;

a first computation unit adapted to compute output probabilities of states of acoustic models, as first likelihood, using the compression-encoded speech parameters received by said reception unit;

a selection unit adapted to select states of acoustic models using only the first likelihood;

a decoding unit adapted to decode the compression-encode speech parameters received by said reception unit;

a second computation unit adapted to compute output probabilities of states of acoustic models selected by said selection unit, as second likelihood, using the decoded speech parameters; and a speech recognition unit adapted to accomplish speech recognition using the second likelihood obtained by said second computation unit.

43. The system according to claim 42, wherein said selection unit selects acoustic models having output probabilities larger than a predetermined value.

44. The system according to claim 42, wherein said selection unit selects acoustic models having output probabilities within a predetermined range of which the largest value is a largest output probability computed by said first computation unit.

45. A speech processing apparatus comprising:

a reception unit adapted to receive compression-encoded speech parameters from a client via a network;

a first computation unit adapted to compute output probabilities of states of acoustic models, as first likelihood, using the compression-encoded speech parameters received by said reception unit;

a selection unit adapted to select states of acoustic models using only the first likelihood;

a decoding unit adapted to decode the compression-encoded speech parameters received by said reception unit;

a second computation unit adapted to compute output probabilities of states of acoustic models selected by said selection unit, as second likelihood, using the decoded speech parameters; and a speech recognition unit adapted to accomplish speech recognition using the second likelihood obtained by said computation unit.

46. The apparatus according to claim 45, wherein said selection unit selects acoustic models having output probabilities larger than a predetermined value.

47. The apparatus according to claim 45, wherein said selection unit selects acoustic models having output probabilities within a predetermined range of which the largest value is a largest output probability computed by said first computation unit.

* * * * *

UNITED STATES PATENT AND TRADEMARK OFFICE
CERTIFICATE OF CORRECTION

PATENT NO. : 6,813,606 B2
DATED : November 2, 2004
INVENTOR(S) : Teruhiko Ueyama et al.

It is certified that error appears in the above-identified patent and that said Letters Patent is hereby corrected as shown below:

Column 6,
Line 10, "$x_I$" should read -- $x_i$ --.

Column 11,
Line 50, "serve" should read -- server --.

Column 13,
Line 20, "generate" should read -- generated --.

Column 16,
Line 3, "encode" should read -- encoded --.

Signed and Sealed this

Twenty-sixth Day of July, 2005

JON W. DUDAS
*Director of the United States Patent and Trademark Office*